(12) United States Patent
Xiu

(10) Patent No.: US 9,473,689 B2
(45) Date of Patent: Oct. 18, 2016

(54) METHOD FOR AUTOMATICALLY SWITCHING TERMINAL FOCUS MODE AND TERMINAL

(71) Applicant: Huawei Device Co., Ltd., Shenzhen (CN)

(72) Inventor: Hongju Xiu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 67 days.

(21) Appl. No.: 14/340,818

(22) Filed: Jul. 25, 2014

(65) Prior Publication Data

US 2014/0333824 A1    Nov. 13, 2014

Related U.S. Application Data

(63) Continuation of application No. PCT/CN2013/075656, filed on May 15, 2013.

(30) Foreign Application Priority Data

May 18, 2012  (CN) .......................... 2012 1 0156740

(51) Int. Cl.
*H04N 5/232* (2006.01)
*H04N 5/235* (2006.01)
*G03B 13/36* (2006.01)

(52) U.S. Cl.
CPC ........ *H04N 5/23212* (2013.01); *H04N 5/2351* (2013.01); *H04N 5/2353* (2013.01); *H04N 5/2354* (2013.01); *G03B 13/36* (2013.01)

(58) Field of Classification Search
CPC .......................... H04N 5/23212; H04N 5/2353
See application file for complete search history.

(56) References Cited

U.S. PATENT DOCUMENTS

| 2005/0104993 | A1  | 5/2005 | Matsumoto et al. |
| 2008/0049137 | A1* | 2/2008 | Endo ............. H04N 5/235 348/333.13 |

(Continued)

FOREIGN PATENT DOCUMENTS

| CN | 1603934 A | 4/2005 |
| CN | 1932631 A | 3/2007 |

(Continued)

OTHER PUBLICATIONS

Foreign Communication From A Counterpart Application, European Application No. 13790418.1, Extended European Search Report dated Aug. 14, 2014, 6 pages.

(Continued)

*Primary Examiner* — Ahmed A Berhan
(74) *Attorney, Agent, or Firm* — Conley Rose, P.C.; Grant Rodolph; Nicholas K. Beaulieu

(57) ABSTRACT

A method for automatically switching a terminal focus mode and a terminal are provided that relate to the terminal field and can more effectively determine a focus mode of a terminal. The method includes: collecting an image data frame; and switching a focus mode of a terminal according to a brightness value of a metering area of the image data frame. The terminal includes: a sensor unit, an imaging unit, and a display unit, where the imaging unit includes: a data frame acquiring module configured to collect an image data frame; and an auto focus control switching module configured to switch a focus mode of the terminal according to a brightness value of a metering area of the image data frame.

15 Claims, 6 Drawing Sheets

(56) References Cited

U.S. PATENT DOCUMENTS

2009/0122158 A1    5/2009  Chen
2010/0045848 A1    2/2010  Sugimoto et al.

FOREIGN PATENT DOCUMENTS

| CN | 101435971 A | | 5/2009 |
|---|---|---|---|
| CN | 101656831 A | | 2/2010 |
| JP | 63172227 A | | 7/1988 |
| JP | 2003295039 A | * | 10/2003 |

OTHER PUBLICATIONS

Foreign Communication From A Counterpart Application, PCT Application No. PCT/CN2013/075656, English Translation of International Search Report dated Aug. 22, 2013, 2 pages.

Foreign Communication From A Counterpart Application, PCT Application No. PCT/CN2013/075656, Written Opinion dated Aug. 22, 2013, 4 pages.

Foreign Communication From A Counterpart Application, Chinese Application No. 201210156740.5, Chinese Office Action dated Dec. 10, 2015, 6 pages.

* cited by examiner

METHOD FOR AUTOMATICALLY SWITCHING TERMINAL FOCUS MODE AND TERMINAL

CROSS-REFERENCE TO RELATED APPLICATIONS

This application is a continuation of International Application No. PCT/CN2013/075656, filed on May 15, 2013, which claims priority to Chinese Patent Application No. 201210156740.5, filed on May 18, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the terminal field, and in particular, to a method for automatically switching a terminal focus mode and a terminal.

BACKGROUND

Working modes of an automatic (auto) focus system of a modern camera are mainly classified into single auto focus, continuous auto focus, and intelligent auto focus.

A working process of single auto focus is enabled by half-pressing a shutter, and a focus process continues before a focus is focused accurately. After a processor considers that the focus is accurate, as long as the shutter is fully pressed, a shooting process is completed. At the same time, the auto focus system stops working. If an object to be shot or a camera moves before the shutter is fully pressed and after an alert tone is played upon focus completion, an unclear picture may be seen after the shutter is fully pressed because "single" auto focus is used. Due to its characteristics, single auto focus is the best choice when a stationary object is shot (for example, scenery, macrophotography, and figure group photo).

Unlike single auto focus, for continuous auto focus, after a processor "considers" that a focus is accurate, an auto focus system keeps working and the focus is not locked, an objective of which lies in that when an object to be shot moves, the auto focus system is capable of driving a lens to adjust in real time according to a change of the focus, thereby always keeping an object to be shot in a clear state. Certainly, a focus frame of a camera also needs to accurately focus on an object to be shot in real time. Continuous auto focus is mostly used for shooting an object in motion, such as shooting a sportsperson in a sports game, shooting a spokesperson in a press conference, and capturing a wonderful moment of an animal in motion.

Intelligent auto focus works in a manner of combining single auto focus and continuous auto focus, which automatically selects a focus manner according to a movement speed of an object to be shot. An internal ranging component constantly measures an image within an automatic focus area, and transmits to a processor in real time. Single auto focus is selected when an object to be shot is stationary while continuous auto focus is selected when an object to be shot is in motion. Because a switching task is performed by the processor, a user only needs to press a shutter.

With the rapid development of a terminal device, at present, many handheld devices such as a mobile phone and a tablet computer integrate a camera module and provide an auto focus function. Generally, single auto focus is adopted due to power consumption, cost, and other reasons. However, for single auto focus, an auto focus process needs to be completed before a photo is taken each time, which therefore causes a time for taking a photo (auto focus time plus shooting time: Tf+Ts) to be too long. In order to accelerate a shooting speed, some terminal vendors use a location detection sensor (for example, gravity sensor) of a device to detect whether a shift occurs on a device. If a movement occurs on a device, an auto focus process is re-initiated. Therefore, when a user presses a shutter to take a photo, a camera is in a focus state or in a focus process. If the camera is in a focus process, wait until the focus is completed, and a photo may be taken with an entire shooting time Tf'+Ts ($0 \leq Tf' < Tf$), which, to a certain extent, shortens the shooting time. This method for detecting a device shift by using a sensor may constantly detect whether a shift occurs on a device. With constant movement of the device, the auto focus process is also constantly initiated, which looks like continuous auto focus; however, its working principle is different from that of continuous auto focus, and may be referred to as pseudo continuous auto focus. Another advantage of adopting this auto focus manner is that a clear image may be obtained in a preview state of a camera.

Although this pseudo continuous auto focus mode may shorten the entire shooting time to a certain extent and obtain a clear image in the preview state of the camera, it also has some shortcomings. When a device is in a dim light environment, it is necessary to fill light with the help of a camera flash in order to ensure successful focus, which is generally referred to as preflashing. In this way, when the device constantly moves, the camera flash ceaselessly preflashes because auto focus is continually initiated, which brings inconvenience to a user. At present, there is an approach, which is to directly close the camera flash; however, in this case, problems that focus fails in a dim light environment and a photo taken is unclear are caused. Therefore, how to effectively determine a focus mode of a terminal becomes an urgent technical problem to be solved.

SUMMARY

Embodiments of the present invention provide a method for automatically switching a terminal focus mode and a terminal, which can solve a technical problem in the prior art that a terminal focus mode cannot be effectively determined.

To achieve the foregoing objective, the embodiments of the present invention adopt the following technical solutions:

In one aspect, a method for automatically switching a terminal focus mode is provided and includes: collecting an image data frame; and switching a focus mode of a terminal according to a brightness value of a metering area of the image data frame.

In another aspect, a terminal is provided and includes: a sensor unit, an imaging unit, and a display unit, including: a data frame statistics acquiring module configured to collect an image data frame; and an auto focus control switching module configured to switch a focus mode of the terminal according to a brightness value of a metering area of the image data frame.

In the method for automatically switching a focus mode and the terminal provided by the embodiments of the present invention, a focus mode can be automatically switched according to a brightness condition of light, thereby effectively determining a focus mode of a terminal.

BRIEF DESCRIPTION OF THE DRAWINGS

To describe the technical solutions in the embodiments of the present invention or in the prior art more clearly, the following briefly introduces accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
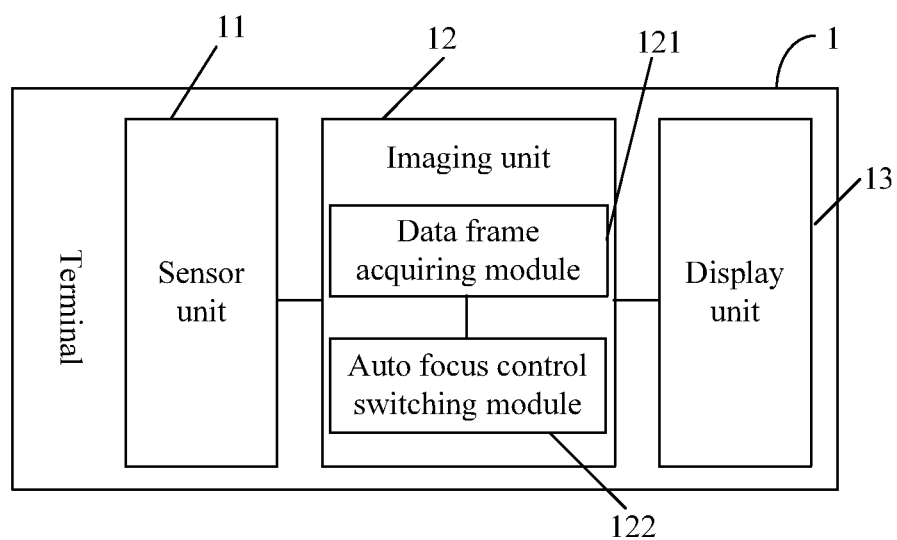
FIG. 1 is a schematic structural diagram of a terminal according to an embodiment of the present invention.

Referring to FIG. 1, a terminal 1 provided by an embodiment of the present invention includes: a sensor unit 11, an imaging unit 12, and a display unit 13, where the imaging unit 12 includes: a data frame acquiring module 121 configured to collect an image data frame; and an auto focus control switching module 122 configured to switch a focus mode of the terminal according to a brightness value of a metering area of the image data frame.

Optionally, the metering area of the image data frame herein may be a focus area of the image data frame, and the metering area may be the entire image data frame, and may also be an image data frame of a focus sampling point or a partial sampling area when a spot metering manner is used.

The terminal provided in the foregoing is capable of automatically switching a focus mode according to a brightness condition of light, thereby more effectively determining a focus mode of a terminal.

Figure 2:
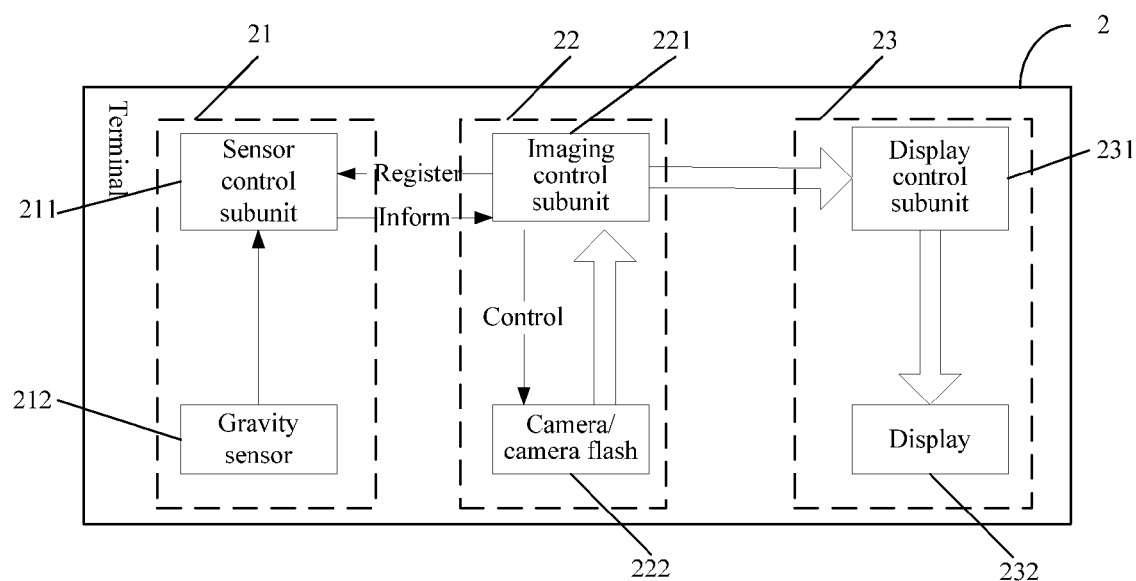
FIG. 2 is a schematic structural diagram of another terminal according to an embodiment of the present invention.

Referring to FIG. 2, a terminal 2 is provided, by using a terminal that can implement continuous auto focus as an example, and includes: a gravity sensor 212, a camera/camera flash 222, a display 232, a sensor control subunit 211, an imaging control subunit 221, and a display control subunit 231. The foregoing gravity sensor 212 and sensor control subunit 211 form a sensor unit 21, the camera/camera flash 222 and imaging control subunit 221 form an imaging unit 22, and the display 232 and display control subunit 231 form a display unit 23. After the terminal is initiated, registration information may be sent to the sensor control subunit 211 by using the imaging control subunit 221. In this case, when a shift occurs on a device, the gravity sensor 212 may inform the imaging control subunit 221 by using the sensor control subunit 211. (Certainly, for a traditional terminal structure, a focus detecting unit may also be used to replace the sensor unit 21. When the focus detecting unit detects that the image data frame loses a focus, the imaging control subunit 221 may be informed by using the sensor control subunit 211.) After receiving a notification, the imaging control subunit 221 controls the camera/camera flash 222 to perform auto focus; the camera returns an image data frame to the imaging control subunit 221; the imaging control subunit 221 processes the received image data frame, and then submits to the display control subunit 231; and the display control subunit 231 controls the display 232 to display. In this process, because the shift of the terminal constantly changes, the gravity sensor 212 constantly sends a notification to the imaging control subunit 221 by using the sensor control subunit 211 (or the focus detecting unit directly sends the notification to the imaging control subunit 221). In this case, the imaging control subunit 221 of the terminal constantly controls the camera/camera flash 222 to perform focus. In the foregoing process, the terminal is in a continuous auto focus mode. Certainly, after the terminal is initiated, unregistration information may also be sent to the sensor control subunit 211 by using the imaging control subunit 221. In this case, the imaging control subunit 221 no longer receives the notification sent by the gravity sensor 212 by using the sensor control subunit 211 when a shift occurs on the terminal. The imaging control subunit 221 controls the camera/camera flash 222 to send collected image information by using single auto focus to the display control subunit 231, and the display 232 displays the collected image information. In the foregoing process, the terminal is in a single auto focus mode.

Figure 3:
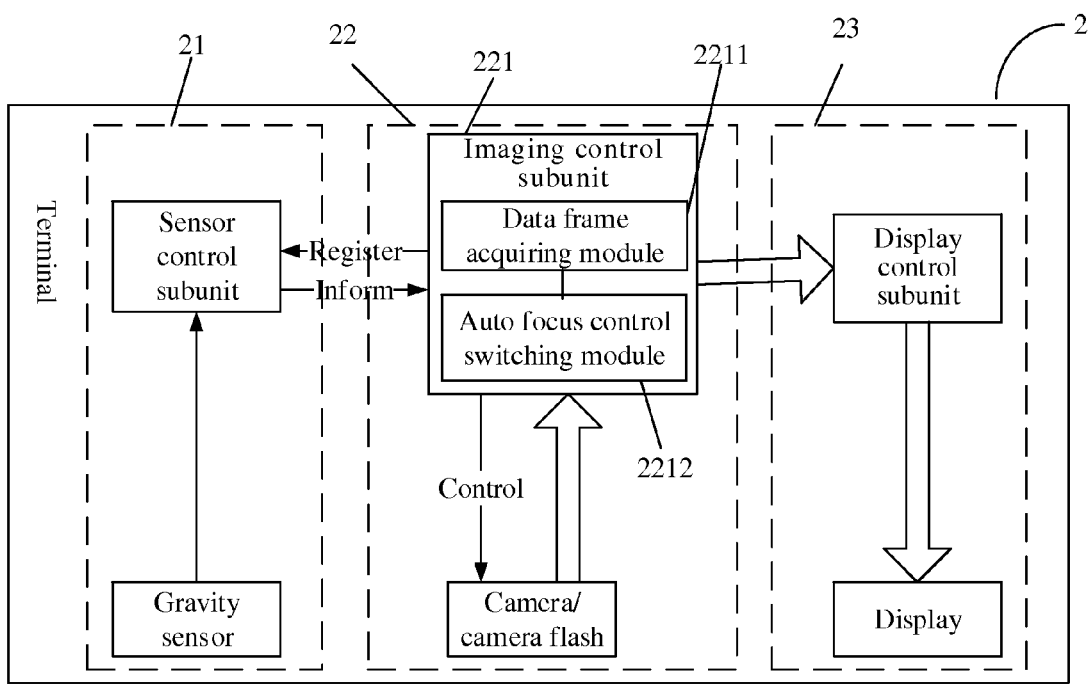
FIG. 3 is a schematic structural diagram of still another terminal according to an embodiment of the present invention.

Referring to FIG. 3, the imaging unit 22 further includes a data frame acquiring module 2211 located in the imaging control subunit 221 configured to collect an image data frame; and an auto focus control switching module 2212 configured to switch a focus mode of the terminal according to a brightness value of a metering area of the image data frame.

Figure 4:
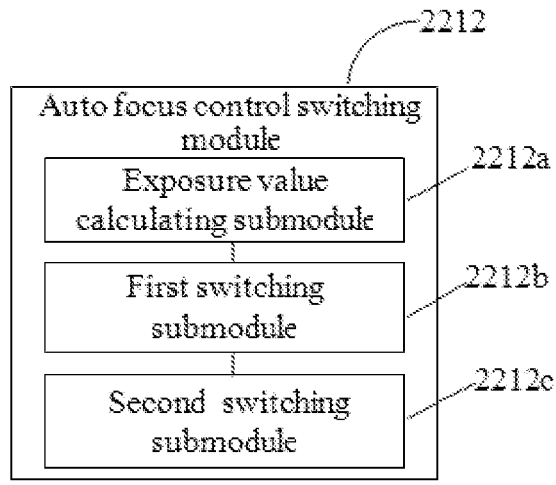
FIG. 4 is a schematic structural diagram of a switching module according to an embodiment of the present invention.

Referring to FIG. 4, the auto focus control switching module 2212 further includes: an exposure value calculating submodule 2212*a* configured to calculate, according to the brightness value of the metering area of the image data frame, an exposure value that needs to be adjusted; where a method for calculating the foregoing brightness value and exposure value may be directly obtained in the prior art by a terminal in an image processing process by using three threads (a primary thread, a configuration thread, and a preview thread) of an underlying software module of the terminal. Statistics and processing needs to be performed on an image data frame collected by the camera in a video front-end processor (VFE) of the imaging unit to generate a statistical value (where the configuration thread controls a configuration of the VFE, 3A (auto focus (AF), auto white balance (AWB), and auto exposure (AE)) processing, post-processing, and obtains a statistical value from the VFE), then the configuration thread calls a function to calculate a brightness value of a current VFE image data frame according to the statistical value, and calculates, according to the brightness value, an exposure value that needs to be adjusted; a first switching submodule 2212*b* configured to switch a focus mode of the terminal to a single auto focus mode when the exposure value exceeds a preset exposure threshold and a current focus mode is a continuous auto focus mode; where the preset exposure threshold herein may be a maximum value of exposure values in an exposure list of the terminal; when the exposure value that needs to be adjusted is larger than the maximum exposure value, it indicates that the camera flash needs to add exposure to a subject to be shot, and therefore, keeping the focus mode of the terminal in a single auto focus mode or switching the focus mode of the terminal to a single auto focus mode can avoid a situation that continuous flicker exists when the camera flash fills light and preflashes in a case that a continuous focus manner is used for shooting a photo under a dim light condition; and it should be noted that, the exposure threshold is the maximum value of the exposure values in the exposure list, where an exposure value in the exposure list of the terminal has an exponential relationship with a ratio of a square of a shutter index of the terminal to an aperture index of the terminal, where if the aperture index is definite, a lower shutter speed, that is, a smaller shutter index, indicates a larger exposure threshold, and certainly, if the shutter index is definite, a larger aperture index indicates a larger exposure threshold; and a second switching submodule 2212*c* configured to determine the exposure value, and when the exposure value does not exceed the preset threshold and the current focus mode is a single auto focus mode, switch the focus mode of the terminal to a continuous auto focus mode, where in this case, it indicates that the camera flash is not required to add exposure to a subject to be shot, and therefore, keeping the focus mode of the terminal in a continuous auto focus mode or switching the focus mode of the terminal to a continuous auto focus mode may shorten a shooting time, where in a focus mode switching process, the imaging control subunit only needs to send registration or unregistration information to the sensor subunit according to the current focus mode and the focus mode that needs to be switched, so as to complete switching of the focus mode.

Figure 5:
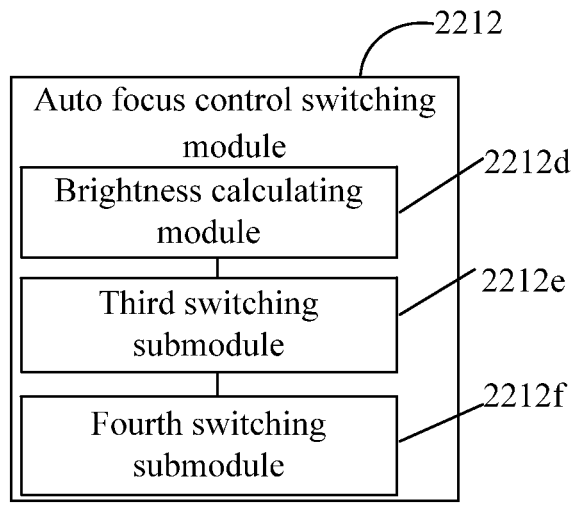
FIG. 5 is a schematic structural diagram of another switching module according to an embodiment of the present invention.

Referring to FIG. 5, an auto focus control switching module 2212 of a terminal for automatically switching a focus mode provided by another embodiment of the present invention includes: a brightness calculating module 2212*d* configured to calculate an average brightness value of a metering area of an image data frame; where because data frame formats when statistics is collected in a VFE of an imaging unit include a Bayer pattern signal, a luminance and chrominance (YUV) brightness and color difference signal, a luminance, blue-difference, and red-difference (YCbCr) standard-definition component signal or a luminance, blue-difference, and red-difference (YPbPr) high-definition component signal, and the like, an average brightness value of brightness value components in image data frames of these formats may be calculated in a preview thread; a third switching submodule 2212*e* configured to determine an average brightness value of a metering area, and when the average brightness value exceeds a preset brightness threshold and a current focus mode is a single auto focus mode, switch a focus mode of the terminal to a continuous auto focus mode; and a fourth switching submodule 2212*f* configured to determine an average brightness value of a metering area, and when the average brightness value does not exceed the preset brightness threshold and the current focus mode is a continuous auto focus mode, switch the focus mode of the terminal to a single auto focus mode, where likewise, in a mode switching process, the imaging control subunit only needs to send registration or unregistration information to a sensor subunit according to the current focus mode and the focus mode to which the current focus mode needs to be switched, so as to complete switching of the focus mode.

Certainly, the terminal provided by the foregoing embodiment may be a camera or a handheld device that integrates a camera function, such as a mobile phone, a tablet computer, and other electronic devices.

Figure 6:
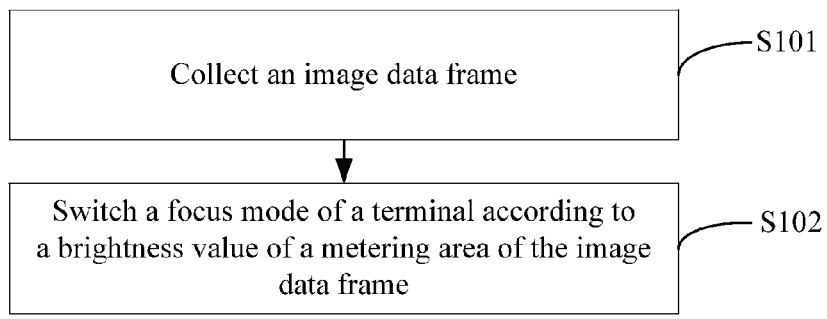
FIG. 6 is a schematic flowchart of a method for automatically switching a terminal focus mode according to an embodiment of the present invention.

Referring to FIG. 6, an embodiment of the present invention provides a method for automatically switching a terminal focus mode, where the method may be performed by a terminal provided by the apparatus embodiment, and includes the following steps:

S101. Collect an image data frame.

S102. Switch a focus mode of a terminal according to a brightness value of a metering area of the image data frame.

Optionally, the metering area of the image data frame herein may be a focus area of the image data frame, and the metering area may be the entire image data frame, and may also be an image data frame of a focus sampling point or a partial sampling area when a spot metering manner is used.

In the method for automatically switching a terminal focus mode provided by the embodiments of the present invention, a focus mode can be automatically switched according to a brightness condition of light, thereby effectively determining a focus mode of a terminal.

Figure 7:
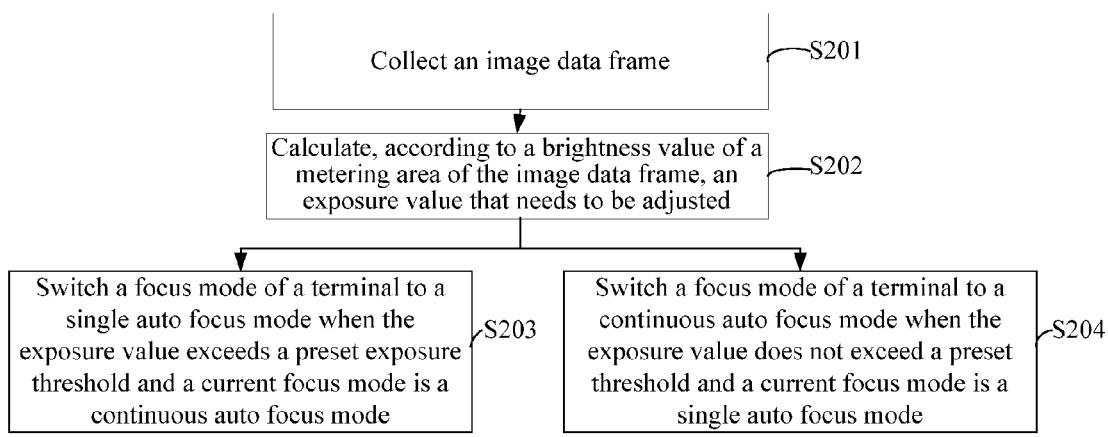
FIG. 7 is a schematic flowchart of another method for automatically switching a terminal focus mode according to an embodiment of the present invention.

Further, referring to FIG. 7, another embodiment of the present invention provides a method for automatically switching a terminal focus mode, where the method may be performed by a terminal provided by the apparatus embodiment, and includes the following steps:

S201. Collect an image data frame.

S202. Calculate, according to a brightness value of a metering area of the image data frame, an exposure value that needs to be adjusted.

For a process of calculating the exposure value in this process, reference may be made to the terminal embodiment corresponding to the switching module shown in FIG. 4.

S203. Switch a focus mode of a terminal to a single auto focus mode when the exposure value exceeds a preset exposure threshold and a current focus mode is a continuous auto focus mode.

Alternatively, S204. Switch a focus mode of a terminal to a continuous auto focus mode when the exposure value does not exceed a preset threshold and a current focus mode is a single auto focus mode.

In the method for automatically switching a terminal focus mode provided by the embodiment of the present invention, a single auto focus mode can be automatically switched to in a dim light situation, and a continuous auto focus mode can be automatically switched to in a light adequate situation, thereby effectively determining a focus mode of a terminal.

Figure 8:
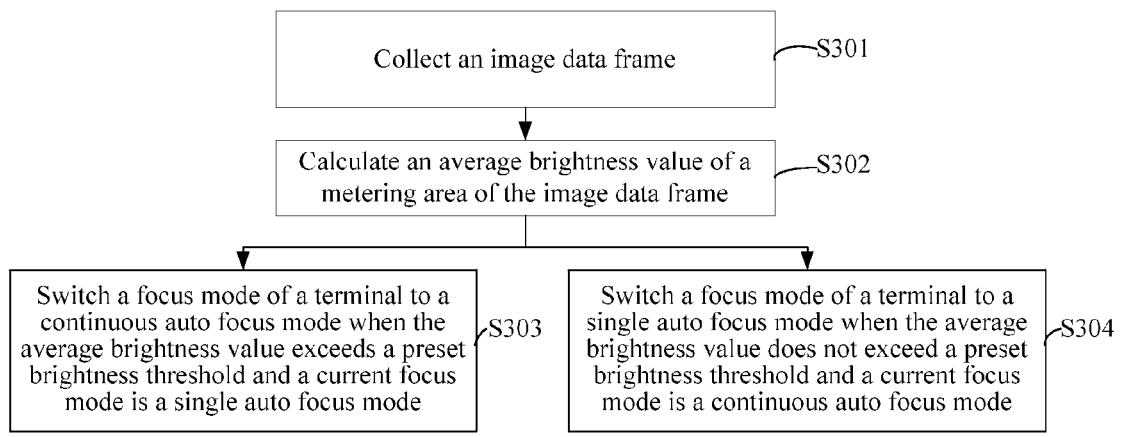
FIG. 8 is a schematic flowchart of still another method for automatically switching a terminal focus mode according to an embodiment of the present invention.

Optionally, referring to FIG. 8, still another embodiment of the present invention provides a method for automatically switching a terminal focus mode, where the method may be performed by a terminal provided by the apparatus embodiment, and includes the following steps:

S301. Collect an image data frame.

S302. Calculate an average brightness value of a metering area of the image data frame.

For a process of calculating an average brightness value in this process, reference may be made to the terminal embodiment corresponding to the switching module shown in FIG. 5.

S303. Determine the average brightness value of the metering area, and when the average brightness value exceeds a preset brightness threshold and a current focus mode is a single auto focus mode, switch a focus mode of a terminal to a continuous auto focus mode.

Alternatively, S304. Determine the average brightness value of the metering area, and when the average brightness value does not exceed a preset brightness threshold and a current focus mode is a continuous auto focus mode, switch a focus mode of a terminal to a single auto focus mode.

In the method for automatically switching a terminal focus mode provided by the embodiment of the present invention, a single auto focus mode can be automatically switched to in a dim light situation, and a continuous auto focus mode can be automatically switched to in a light adequate situation, thereby effectively determining a focus mode of a terminal.

It should be noted that, for brevity, reference may be made to the terminal embodiments of the present invention for a portion that is not described in detail in the method embodiments of the present invention.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that is capable of storing program code, such as a read-only memory (ROM), a random-access memory (RAM), a magnetic disk, or an optical disc.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for automatically switching a terminal focus mode, comprising:
    collecting an image data frame; and
    switching a focus mode of a terminal according to a brightness value of a metering area of the image data frame and a preset exposure threshold,
    wherein the preset exposure threshold comprises a maximum value of exposure values in an exposure list,
    wherein the exposure values in the exposure list have an exponential relationship with a ratio of a square of a shutter index of the terminal to an aperture index of the terminal, and
    wherein the metering area comprises only an in-focus area of the image data frame.

2. The method according to claim 1, wherein switching the focus mode of the terminal according to the brightness value of the metering area of the image data frame and the preset exposure threshold comprises:
    calculating, according to the brightness value of the metering area of the image data frame, an exposure value that needs to be adjusted;
    switching the focus mode of the terminal to a single auto focus mode when the exposure value exceeds the preset exposure threshold and a current focus mode is a continuous auto focus mode; and
    switching the focus mode of the terminal to a continuous auto focus mode when the exposure value does not exceed the preset threshold and the current focus mode is a single auto focus mode.

3. The method according to claim 1, wherein switching the focus mode of the terminal according to the brightness value of the metering area of the image data frame and the preset exposure threshold comprises:
    calculating an average brightness value of the metering area of the image data frame;
    switching the focus mode of the terminal to a continuous auto focus mode when the average brightness value exceeds the preset brightness threshold and a current focus mode is a single auto focus mode; and
    switching the focus mode of the terminal to a single auto focus mode when the average brightness value does not exceed a preset brightness threshold and a current focus mode is a continuous auto focus mode.

4. The method according to claim 1, wherein the metering area is a focus sampling point that is less than the entire image data frame.

5. The method according to claim 1, wherein spot metering is used, and wherein the metering area is a partial sampling area.

6. A terminal, comprising:
    a sensor;
    an imager; and
    a display,
    wherein the imager is configured to:
        collect an image data frame; and
        switch a focus mode of the terminal according to a brightness value of a metering area of the image data frame and a preset exposure threshold,
    wherein the preset exposure threshold comprises a maximum value of exposure values in an exposure list,
    wherein the exposure values in the exposure list have an exponential relationship with a ratio of a square of a shutter index of the terminal to an aperture index of the terminal, and
    wherein the metering area comprises an in-focus area of the image data frame that is less than all of the image data frame.

7. The terminal according to claim 6, wherein the imager is further configured to:
    calculate, according to the brightness value of the metering area of the image data frame, an exposure value that needs to be adjusted;
    switch the focus mode of the terminal to a single auto focus mode when the exposure value exceeds the preset exposure threshold and a current focus mode is a continuous auto focus mode; and
    switch the focus mode of the terminal to a continuous auto focus mode when the exposure value does not exceed the preset threshold and the current focus mode is a single auto focus mode.

8. The terminal according to claim. 6, wherein the imager is further configured to:

calculate an average brightness value of the metering area of the image data frame;
determine the average brightness value of the metering area;
switch the focus mode of the terminal to a continuous auto focus mode when the average brightness value exceeds the preset brightness threshold and a current focus mode is a single auto focus mode; and
switch the focus mode of the terminal to a single auto focus mode when the average brightness value does not exceed the preset brightness threshold and the current focus mode is a continuous auto focus mode.

9. The terminal according to claim 6, wherein the metering area is a focus sampling point that is less than the entire image data frame.

10. The terminal according to claim 6, wherein spot metering is used, and wherein the metering area is a partial sampling area.

11. A non-transitory computer-readable medium having computer usable instructions stored thereon for execution by a processor, wherein the instructions cause the processor to:
collect an image data frame; and
switch a focus mode of a terminal according to a brightness value of a metering area of the image data frame and a preset exposure threshold,
wherein the preset exposure threshold comprises a maximum value of exposure values in an exposure list,
wherein the exposure values in the exposure list have an exponential relationship with a ratio of a square of a shutter index of the terminal to an aperture index of the terminal, and
wherein the metering area comprises an in-focus area of the image data frame, but not the entire image data frame.

12. The non-transitory computer-readable medium according to claim 11, wherein the instructions cause the processor to switch the focus mode of the terminal according to the brightness value of the metering area of the image data frame and the preset exposure threshold comprises the instructions causing the processor to:
calculate, according to the brightness value of the metering area of the image data frame, an exposure value that needs to be adjusted;
switch the focus mode of the terminal to a single auto focus mode when the exposure value exceeds the preset exposure threshold and a current focus mode is a continuous auto focus mode; and
switch the focus mode of the terminal to a continuous auto focus mode when the exposure value does not exceed the preset threshold and the current focus mode is a single auto focus mode.

13. The non-transitory computer-readable medium according to claim 11, wherein the instructions cause the processor to switch the focus mode of the terminal according to the brightness value of the metering area of the image data frame and the preset exposure threshold comprises the instructions causing the processor to:
calculate an average brightness value of the metering area of the image data frame;
switch the focus mode of the terminal to a continuous auto focus mode when the average brightness value exceeds the preset brightness threshold and a current focus mode is a single auto focus mode; and
switch the focus mode of the terminal to a single auto focus mode when the average brightness value does not exceed a preset brightness threshold and a current focus mode is a continuous auto focus mode.

14. The non-transitory computer-readable medium according to claim 11, wherein the metering area is a focus sampling point that is less than the entire image data frame.

15. The non-transitory computer-readable medium according to claim 11, wherein spot metering is used, and wherein the metering area is a partial sampling area.

* * * * *